United States Patent [19]
Lovejoy et al.

[11] Patent Number: 5,179,852
[45] Date of Patent: Jan. 19, 1993

[54] HIGH-INTENSITY ROTARY PEENING PARTICLE SUPPORT AND METHOD OF MAKING SAME

[75] Inventors: Michael W. Lovejoy, Prescott, Wis.; Jennifer L. Trice, Eagan, Minn.

[73] Assignee: Minnesota Mining and Manufacturing Company, St. Paul, Minn.

[21] Appl. No.: 788,498

[22] Filed: Nov. 6, 1991

[51] Int. Cl.$^5$ ................................................ C21D 7/06
[52] U.S. Cl. ............................................ 72/53; 51/334; 29/90.7
[58] Field of Search ............... 72/53; 29/90.7; 51/332, 51/334, 337, 401, 402

[56] References Cited

U.S. PATENT DOCUMENTS

| | | | |
|---|---|---|---|
| 3,638,464 | 2/1972 | Winter et al. | 72/53 |
| 3,648,498 | 3/1972 | Voss et al. | 72/53 |
| 3,834,200 | 9/1974 | Winter | 72/53 |
| 4,319,934 | 3/1982 | Henning | 148/12 F |
| 4,322,247 | 3/1982 | Henning | 75/128 F |
| 4,322,256 | 3/1982 | Henning | 148/36 |
| 4,404,047 | 9/1983 | Wilks | 148/131 |
| 4,481,802 | 11/1984 | Harmon et al. | 72/53 |
| 4,635,456 | 1/1907 | Harmon | 72/53 |
| 4,654,913 | 4/1987 | Grube | 10/86 B |

FOREIGN PATENT DOCUMENTS

| | | | |
|---|---|---|---|
| 2434368 | 2/1975 | Fed. Rep. of Germany | 72/53 |
| 2551996 | 3/1985 | France | 72/53 |

OTHER PUBLICATIONS

Minnesota Mining and Manufacturing Company Product Brochure No. 61-5000-5490-4 (1282) II, "Heavy Duty Roto Peen", published Dec. 1988.
Metals Handbook, 9th Edition, vol. 4, pp. 135-142.
Metals Handbook 9th Edition, vol. 1, pp. 476-477.
Waterbury Farrell Service Manual for "Hi-Pro Header", Publication Date Unknown, But Prior to 1950.
"Baltec Radial Riveting Machine Operating Manual", Published by the Bracker Corp., Published in 1981.

*Primary Examiner*—David Jones
*Attorney, Agent, or Firm*—Gary L. Griswold; Walter N. Kirn; Jeffrey L. Wendt

[57] ABSTRACT

An improved high-intensity rotary peening particle support of the type having a plurality of peening particles metallurgically secured to an exposed face thereof is presented, the support having a base composition consisting essentially of from about 0.08 to about 0.34 weight percent carbon, the balance iron, and a Ni-enriched layer which provides a hard, wear resistant surface. A method of producing such a support is also described, the method including cold forming a peening particle support base composition as described, stress relieving, brazing peening particles to an exposed face of the support, austenitizing, quenching, and tempering the support to form a support having a Ni-enriched layer which is harder than the base composition.

24 Claims, 4 Drawing Sheets

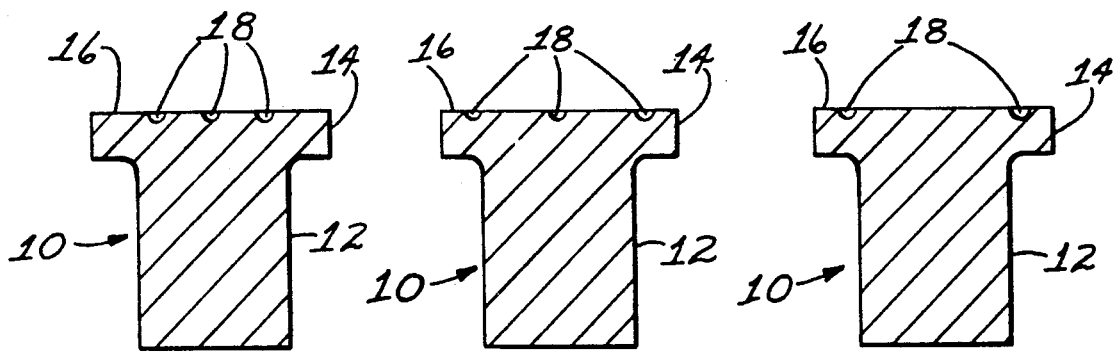
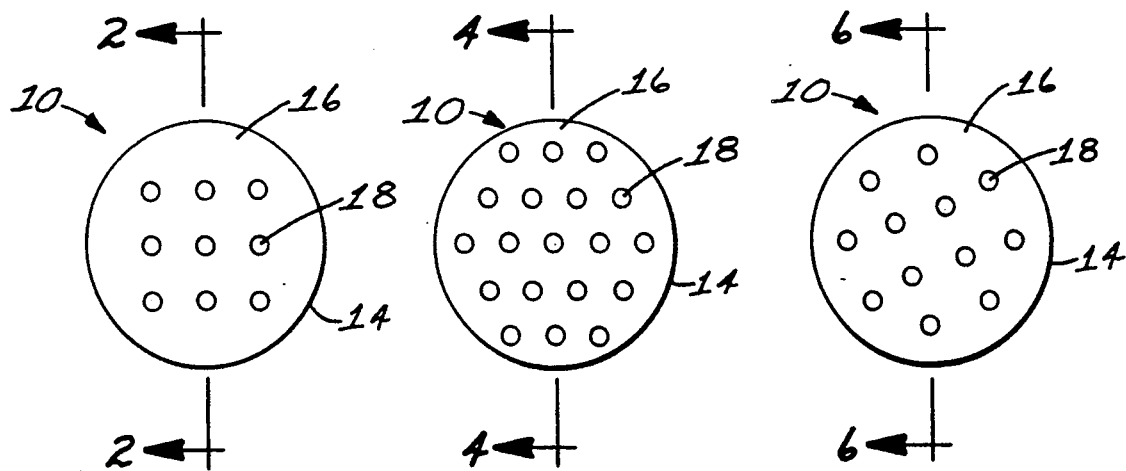
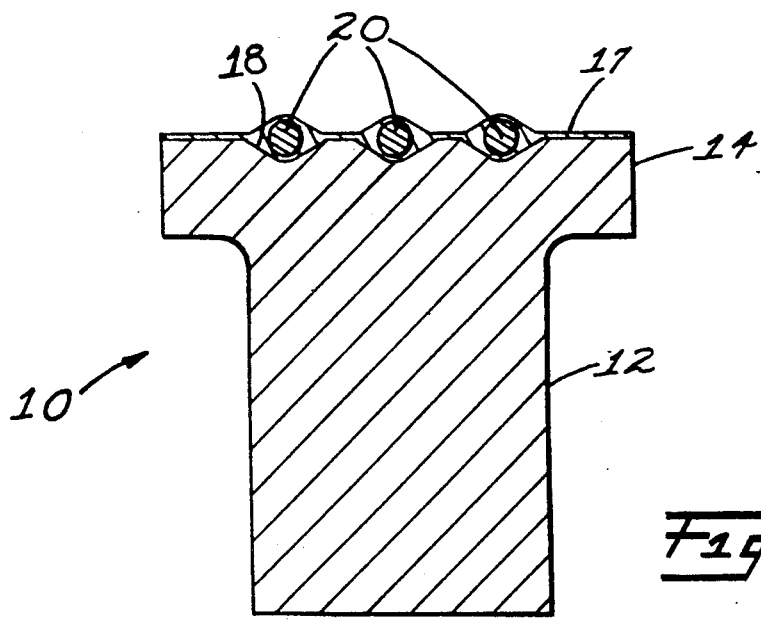

HIGH-INTENSITY ROTARY PEENING PARTICLE SUPPORT AND METHOD OF MAKING SAME

This application is related to application Ser. Nos. 07/788,550 and 07/788,653, filed Nov. 6, 1991 simultaneously herewith.

TECHNICAL FIELD

This invention relates to high-intensity rotary (roto) peening devices of the type having a plurality of rotating flaps, each flap having attached thereto a plurality of peening particle supports More specifically, the invention relates to a novel high-intensity roto peening particle support exhibiting longer useful life, and to a method of making same.

BACKGROUND ART

"Roto peening", the use of rotating flaps having abrasive particles attached thereto, is gaining acceptance in the stress relieving, surface conditioning, and coating removal fields due to a variety of reasons. The process eliminates the use of "shot" to peen concrete and metal surfaces, and, where a coating is to be removed from such surfaces, no solvent need be used to loosen the coating Roto peening is thus an economical and environmentally sound procedure.

Flaps used in roto peening devices such as the wheel disclosed in Minnesota Mining and Manufacturing Company, St. Paul, Minn. (3M) product brochure no. 61-000-5490-4(1282)11, published December, 1988, typically include an elongate strap of material to which several metal (typically AISI 1006 or 1008 steel) peening particle supports are attached. As used herein, the term "peening particle support" means a structure including a metal base composition, the base having abrasive particles metallurgically fastened (for example, brazed) to an exposed surface thereof. Winter U.S. Pat. No. 3,834,200 describes such flaps in detail, as does the inventor's co-pending application Ser. No. 07/788,550 filed on even date herewith, both of which are incorporated herein by reference. Although the polyester polyurethane coated nylon fabric strap material and AISI 1008 steel peening particle supports of Winter have provided extended life in a variety of uses, in certain "high-intensity" peening operations, such as surface conditioning of concrete and removal of scale from steel, even longer flap life is desirable. As the useful life of a flap can be shortened either by strap or by peening particle support failure, the materials used in each are critical to performance of the flaps. This invention relates to improved peening particle supports which have provided longer life over previously known supports.

"Peening particle support failure", as used herein, means either the shank and head of a rivet used as support have been severed (rivet failure), or that the abrasive particles have been rendered ineffective. The latter can occur either by the particles falling off or by the particles actually being forced into the peening particle support material forming a flattened, less abrasive support. Each of these failure mechanisms is affected by the metallurgy and processing history of the peening particle support. Rivets made from AISI 1008 steel and other low carbon steels, while more easily cold formed, suffer from these failure mechanisms.

Peening particle supports, when used in the form of rivets, and flaps incorporating the rivets, are currently produced by a complicated series of steps. A rivet of AISI 1008 steel having dimples on its upper exposed surface is first produced by cold heading (forming) a piece of wire stock using a two stroke cold heading machine. The rivet is then stress relieved by heating to about 650° C., after which the abrasive particles are brazed to the rivet dimples using a nickel (Ni) alloy brazing powder. The "brazed rivets" are then austenitized (heated above about 835° C.), quenched and tempered (heating to about 700° C.). The "tempered rivets" are then fastened to the flap using another cold forming step. Both the initial cold forming step and the final cold forming step are made easier by the low carbon content of 1008 steel.

Following the above procedures to make flaps, it was found that, although satisfactory for many applications, peening particle support failure limited flap life. This became especially true when stronger elongate strap materials made using linear polyurethane elastomer coated fabrics were used. Thus, an unmet need exists for a peening particle support which provides extended life of peening flaps in such high-intensity roto peening operations as mentioned above, but which is also easily formed into the desired shape using low power (about $3 \times 10^5$ N force) cold heading machines.

U.S. Pat. No. 4,404,047 describes an electrical heating process for heat treating steels which includes a "temper straightening" step. Workpieces are preferably those having repeating cross-sections, such as bars, rods, tubes, and the like. While many grades of steel can be treated in this fashion, including AISI 1021 steel having 0.0029 weight percent boron (B), there is no suggestion of forming a peening particle support or rivet using the process or material.

U.S. Pat. No. 4,654,913 describes a method for producing captive washer wheel nuts wherein a variety of machining steps are performed on a nut-washer blank. Although this patent notes that any process may be used to form the blank, including cold forming of 10B21 steel (1021 steel having from 0.0005 to about 0.003 weight percent B), there is no further heat treatment of the blank which would suggest using 10B21 steel for roto peening.

U.S. Pat. Nos. 4,319,934, 4,322,256, and 4,322,247 describe a method of forming tools from alloy steels using severe cold forming, an alloy steel, and tools made therefrom, respectively. The steel preferably has from 0.28 to 0.33 weight percent C and 0.0005 to 0.0035 weight percent B, as well as other additives such as silicon (Si) and manganese (Mn), which apparently have the synergistic effect of allowing superior ductility and low work hardening for use in severe cold forming processes to provide products with high static and dynamic strength B is added to increase the homogeneity and hardenability of the steel. However, there is no suggestion or motivation to use such a steel in the formation of a rotary peen particle support. The material would be expected to be too hard (too high C content) to be cold formed using low power cold heading machines used to form rivet-type peening particle supports. This is evidenced by the 500 ton press used to cold form the tools.

SUMMARY OF THE INVENTION

In accordance with the present invention an improved high-intensity roto peening particle support and method of making same are presented which overcome or reduce many of the aforementioned disadvantages of previously known constructions and methods. The invention provides an improved high-intensity rotary peening particle support of the type having a plurality of peening particles metallurgically secured to an exposed face thereof. The improvement lies in the support having a base composition consisting essentially of from about 0.08 to about 0.34 weight percent C, a Ni-enriched layer extending below that exposed surface, the Ni-enriched layer having weight percent Ni greater than the base composition, and the balance iron (Fe). Preferred supports are those made from 10B21 steel having from 0.0005 to about 0.003 weight percent B, in the form of rivets having peening particles metallurgically compatible with the base composition brazed to the exposed surface using a Ni alloy brazing compound. The Ni (and to a lesser extent the B) in the brazing compound diffuses down into the base composition during brazing and subsequent heat treatment. A Ni-enriched layer is formed and, in conjunction with the B in the base composition, creates a higher hardness exposed surface and underlying region of about 0.5 mm in thickness owing to the effectively higher Ni concentration than the base composition. Peening particle supports having the above construction contain enough C to be sufficiently hardenable via heat treatment while having the maximum allowable C content to be formed using the two-stroke cold heading (forming) machines currently used to form rivet-type supports from low C steels.

The invention also includes an improved method of making a rotary peening particle support which reduces peening particle support failure, the support having a plurality of peening particles metallurgically secured to an exposed face thereof. The method is of the type including the consecutive steps of cold forming a base metal stock preform to form the support, heating the cold formed support for a time and at a temperature sufficient to stress relieve the support, metallurgically joining a plurality of peening particles to an exposed surface of the support, heating the support for a time and at a temperature sufficient to austenitize the support, quenching the support, and heating the support for a time and at a temperature sufficient to temper the support, wherein the improvement comprises the base metal stock consisting essentially of from about 0.08 to about 0.34 weight percent C, the balance Fe. Preferred are those methods wherein the base metal has from about 0.0005 to 0.003 weight percent B and wherein support is in the form of a rivet and the base metal stock is steel having from about 0.18 to about 0.23 weight percent C, and wherein the peening particles are brazed to the support using a Ni brazing alloy.

An alternative embodiment of the invention is a rotary peening support, the support having a plurality of peening particles brazed thereto. The support in this embodiment includes a base composition and a Ni-enriched layer, the base composition consisting essentially of the composition above described, while the Ni-enriched layer lies substantially near the peening particles. The Ni-enriched layer is the result of diffusion of Ni from the brazing compound into the base composition. Preferred are those supports wherein the Ni-enriched layer has a hardness ranging from about 20 to 60 HRC (Rockwell Hardness C) and a thickness ranging from about 0.01 mm to about 0.5 mm. One preferred base composition also has a hardness ranging from about 20 to about 60 HRC, obtained when 10B21 steel is tempered at low tempering temperature (about 400° C.). Another preferred range of base composition hardness ranges from about 80 HRB to about 30 HRC, obtained when a steel such as 10B21 is tempered at about 700° C. Structures such as these provide a hard peening surface while allowing low power cold forming machines to be utilized to form peening flaps using these supports.

Still another aspect of the invention is a method of making a rotary peening particle support of the rivet-type having peening particles secured to an exposed surface thereof, said method comprising (a) cold forming a metal stock into a rivet, the rivet having a plurality of depressions in its exposed surface, the metal stock having the composition above described;

(b) stress relieving the rivet of steps (a);

(c) brazing the peening particles to the exposed surface;

(d) austenitizing and quenching the rivet of step (c); and (e) tempering the rivet of step (d) at the desired tempering temperature and for a time sufficient to produce the desired hardness for said rivet.

Preferred are those methods wherein the brazing is carried out using the preferred Ni-brazed alloy, described herein. Two tempering temperatures are preferred, a high (675° C.–730° C.) temperature and a low (390° C.–410° C.) temperature, the temperature chosen depending on the cold forming power of the particular machine used to flare the rivet shank. The higher tempering temperature yields a structure having high surface hardness but low interior hardness. The lower temperature is preferred when a through hardened structure is desired. The method thus allows flexibility in adjusting the physical characteristics of the rivets to meet specific needs.

The novel features and advantages of the present invention will become more apparent to those skilled in the art upon consideration of the following detailed description which refers to the accompanying drawings.

BRIEF DESCRIPTION OF THE DRAWING

FIG. 1 is a plan view of one embodiment of a rivet-type peening particle support base in accordance with the present invention prior to brazing of abrasive particles thereto;

FIG. 2 is a cross-sectional view of the embodiment of FIG. 1;

FIG. 3 is a plan view of a second embodiment of a rivet-type peening particle support base in accordance with the present invention prior to brazing;

FIG. 4 is a cross-sectional view of the embodiment of FIG. 3;

FIG. 5 is a plan view of a third embodiment of a rivet-type peening particle support base in accordance with the present invention prior to brazing;

FIG. 6 is a cross-sectional view of the embodiment of FIG. 5;

FIG. 7 is a cross-sectional view of the embodiment of FIG. 1 having peening particles brazed thereto;

DESCRIPTION OF PREFERRED EMBODIMENTS

Figure 8:
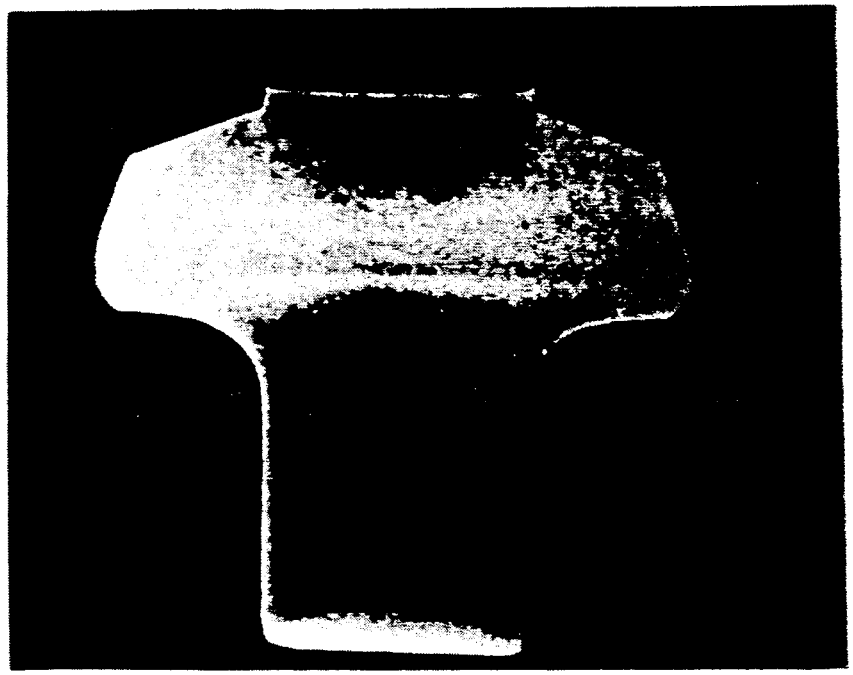
FIG. 8 shows a photomicrograph (8x) of a cross-sectioned, chemically etched AISI 10B21 rivet preform after the first stroke of the cold heading machine.

The peening particle supports of the present invention are designed to reduce peening particle support failure in high-intensity rotary peening flaps which incorporate them. FIGS. 1-6 illustrate three embodiments of peening particle supports in the form of rivets having dimples on the upper exposed face thereof, that is, prior to brazing of the peening particles thereto. In any of a variety of embodiments, including those illustrated in FIGS. 1-6, the preferred base composition (i.e., all but the exposed surface and material down about 0.5 mm from this surface) has from about 0.08 to about 0.34 weight percent C. Preferred embodiments include those where the base composition also has from about 0.0005 to 0.003 weight percent B. One preferable steel having the latter composition is AISI 1021 steel having the stated B content (referred to herein as AISI 10B21 steel, or simply 10B21).

FIGS. 1, 3, and 5 show plan views of three rivet-type embodiments of peening particle support bases. FIG. 1 shows nine dimples arranged in a centered square pattern, while FIGS. 3 and 5 illustrate two other patterns found useful. Of course, other arrangements and numbers of dimples are possible and deemed within the scope of the present invention.

Referring now to FIGS. 2, 4, and 6, shown are cross-sectional views of three rivet-type embodiments of the peening particle support of the present invention, identical reference numerals used in each figure to denote similar features. In each case, rivet 10 has a shank 12 and a head 14, as shown, with the diameter of head 14 greater than that of shank 12 typically by a ratio ranging from about 2:1 to about 5:2. Head 14 has an exposed surface 16 which further has dimples 18 adapted to receive generally spheroidal peening particles (not shown) during brazing. Dimples 18 can be of the same or different diameter on a given rivet to accommodate different diameter particles, but the particles and dimples are preferably all the same diameter on a given rivet for ease of manufacture and to lower manufacturing cost. The diameter of the particles and the dimples into which they are placed can range from about 0.25 mm to about 2 mm, more preferably from about 1 mm to about 1.5 mm. The embodiments of FIGS. 1-4 have dimple/particle diameters of 1.11 mm, while the embodiment shown in FIGS. 5 and 6 preferably have dimple/particle diameters of 1.6 mm. The larger diameters are used when more aggressive peening action is required, such as to remove heavy oxide scale or coatings from metal, and concrete surface preparation. Head 14 in FIGS. 1 and 2 has diameter of 1.04 cm while the head shown in FIGS. 3-4 has diameter of 1.18 cm and that of FIGS. 5-6 has diameter of 1.27 cm. Other head diameters may be preferable depending on the particular operation.

FIG. 7 illustrates a cross-sectional view of the peening particle support base of FIGS. 1 and 2 having peening particles brazed thereto. The particles are preferably spheroidal, although other shapes, such as rectangular, may be used. Spheroidal particles typically have one hemisphere within a dimple and the other hemisphere out of the dimple. Refractory-hard, impact fracture-resistant peening particles are utilized because the particles must retain their integrity during the life of the peening flap in order to maintain constant impact pressure. Refractory-hard cemented tungsten carbide shot, known by the trade designation "Grade 44A," available from Carboloy Inc., of Detroit, Mich., have been found to have an excellent combination of properties. (This particular tungsten carbide includes a binder having about 8-12 weight percent Ni or Co.) However, other cemented carbides, for example, TiC and TaC; ceramic materials, for example, $B_4C$ and hot-pressed alumina, as well as other wear-resistant, refractory-hard peening particles are also useful. A convention has been developed to identify various rivets and shot sizes: Type "B" rivet has a head diameter of 1.04 cm, with 9 shot particles of 1.1 mm diameter; Type "C" rivets have a head diameter of 1.18 cm with 19 shot particles of 1.1 mm diameter, and Type "D" rivets have a head diameter of 1.27 cm with 12 shot particles of 1.6 mm diameter. It will be appreciated that variations in shot size, shot pattern, etc., are within the skilled artisan's knowledge. For example, the Type B rivets shown in FIGS. 1 and 2 have a centered square array of particles.

The peening particles are typically metallurgically bonded to the exposed surface 16. The support bases and peening particles must, of course, be compatible for metallurgical bonding. Such bonding may be accomplished by brazing, casting the peening particles in place in the support base, sintering, or any other available method for forming the required bond. Preferred is brazing, using a brazing alloy preferably having about 80-85% by weight Ni and about 3% B. A brazing alloy meeting these preferences is that sold under the trade name "Amdry 770 Powder", commercially available from Sulzer Plasma Technic, Inc., Troy, Mich. This brazing alloy has the following specifications: 0.05 maximum weight % Al; 2.75 minimum, 3.50 maximum B; 0.06 maximum C; 0.10 maximum Co; 5.0 minimum, 8.0 maximum Cr; 2.5 minimum, 3.5 maximum Fe; 0.02 maximum P; 0.02 maximum S; 4.00 minimum, 5.00 maximum Si; 0.005 maximum Se; 0.05 maximum Ti; 0.05 maximum Zr; and balance Ni. The particle size distribution of the powder is 90% minimum −140 mesh (−105 micrometers), 50% maximum at −325 mesh (+45 micrometers).

Other braze alloys are possible for use but their use is less than optimal. Copper braze alloys have high fluidity which could lead to infiltration of copper into the tungsten carbide shot. Also, the vaporization potential of copper is high so that high partial pressures must be maintained in the brazing furnace, usually using argon gas. Silver braze alloys are soft and have poor mechanical properties, rendering them unusable for most abrasives applications. Silver braze alloys typically melt around 815° C. and would remelt during subsequent heat treatment processes. In light of these limitations Ni alloy brazing powders are preferred. The preferred Ni brazing alloy, mentioned above, is available in large quantities at comparatively low cost. The Ni alloy is easy to use and has a wide melting range. Initially, the Ni alloy becomes fully liquid at about 1000° C. because of low melting constituents, Si and B. These elements diffuse into the base composition or vaporize, however, and remelting after brazing requires a considerably higher temperature. Other advantages of Ni alloy brazing compositions include their strength, corrosion resistance, and hardness.

Although not intending to be held to any particular theory, it is believed that Ni (and to a certain extent, the B) from the Ni alloy brazing compound diffuses from surface 16 and into the base material of the rivet approximately 0.5 mm, increasing both the hardenability and hardness of that portion of the rivet to which the Ni diffuses. The Ni-enriched layer may have a Ni weight percent ranging from 0.02 to about 80 weight percent Ni, with the greater concentration occurring near surface 16. When using base compositions and brazing compound having the preferred compositions, and by tempering at a temperature ranging from about 675° C. to about 730° C., a soft rivet in terms of hardness (80 HRB to 30 HRC) is produced. Rivets having this range of hardness (the hardest location being near the exposed surface) have been found to have reduced wear during peening. A range of hardness from top to bottom of the rivet of no more than 10 Rockwell C hardness units may be produced after tempering at a temperature range of about 390° C.-410° C. This may be preferred if a machine having more heading capacity (i.e., power) is available. This is preferred since a harder support is formed (about 35-42 HRC). Ni and B are individually known to increase the hardenability of steels; however, the degree to which the particular combination of base material, brazing compound, and tempering temperatures can be adjusted to produce either a nearly uniform hardness rivet or a high surface hardness/low base hardness rivet was a highly unexpected result.

When peening particle supports of the rivet-type as described herein are used in rotary peening flap constructions, the preferred elongate strap material is a coated fabric having a plurality of coating layers, at least one of the layers including a linear polyurethane elastomer. These coated fabrics are described in detail in co-pending application Ser. Nos. 788, 550 and 788,653, filed of even date herewith and incorporated herein by reference. The preferred linear polyurethane elastomer is a polycarbonate-polyether polyurethane made from the reaction product of a mixture polycarbonate polyol and a polyether polyols, a diisocyanate compound, and first and second extenders. The first extender preferably has a molecular weight of less than about 500, and the diisocyanate compound is initially reacted with the first extender in a molar ratio of diisocyanate to first extender of above about 2:1 to form a modified diisocyanate having a functionality of about 2 prior to reaction with the other components. The modified diisocyanate component provides relatively low temperature processing properties to the composition during fabric coating, whereas the polyol mixture provides superior hydrolytic and low temperature flexibility to the coated fabric. The linear polyurethane elastomer may also be crosslinked to provide a stiffer coated fabric by reacting a crosslinking agent such as an organic isocyanate compound having a functionality of at least 2 with the elastomer. One suitable polycarbonatepolyether polyurethane is that sold under the trade name "Morthane CA-1225" (Morton International).

A variety of flap constructions may be used, all incorporating the peening particle supports described herein. Convention flap constructions, such as those shown in U.S. Pat. Nos. 3,638,464 and 3,834,200, may benefit, as well as those improved constructions described in co-pending application Ser. No. 788,500 of even filing date.

The peening particle supports of the present invention are advantageously formed using cold forming and heat treating procedures similar to those used to produce previously known peening particle supports. Furthermore, the use of base compositions as above described, especially AISI 10B21 steel, allows more uniform rivet-to-rivet hardness in the brazing step as explained in the following examples. Although rivets are formed having a dimpled exposed surface (i.e., semi-circular depressions in the exposed surface), other depressions such as rectangular, oval, and the like are possible.

The examples which follow describe in detail the procedure used to form rivet-type peening particle supports using AISI 10B21 steel. One other preferred material is a case-hardened, low carbon steel structure. While this structure may be used effectively for short periods of time, the two-phase microstructure (ferrite and islands of pearlite) of the central portion of rivets made with this material limits their useful life. It is well known that the two-phase microstructure suffers fatigue failure much sooner than a bainitic microstructure.

A case-hardened structure may be obtained for a 1010 steel rivet using well known gas carburizing methods. A general description of gas carburizing methods is given in the *Metals Handbook*, Ninth Edition, Volume 4 (Heat Treating), pages 135 et. seq. Gas carburizing, in current commercial practice, uses carbon from hydrocarbon gases and easily vaporized hydrocarbon liquids to produce a hard surface layer on steel parts. Gas carburizing is often referred to as "case carburizing". The main function of gas carburizing is to provide an adequate supply of carbon for absorption and diffusion into the steel.

Successful operation of the gas carburizing process depends on control of there principal variables: temperature, time, and atmosphere composition. The maximum rate at which carbon can be added to steel is limited by the rate of diffusion of carbon in austenite. This diffusion rate increases greatly with temperature; the rate of carbon addition at 925° C. is about 40% greater than at 870° C., making 925° C. the preferred carburizing temperature.

F. E. Harris developed a formula for the effect of time and temperature on the case depth for normal carburizing (*Metals Progress*, August, 1943) Using this formula, it can be shown that the time required to through carburize 1010 rivets (0.9525 cm shank diameter, 0.4763 cm penetration depth) would be about 56 hours, assuming a "normal" carburizing, which is not possible when attempting to carburize a basket of rivets. Thus, although case-hardened 1010 steels can be used for high-intensity rotary peening as supports for peening particles, the fatigue failure aspect of the case-hardened 1010 steel and long soak times necessary to produce through-hardened 1010 steel makes the use of 1010 steel less than optimal. (The portion of *Metal Handbook*, Volume 4, referred to above is incorporated herein by reference thereto.)

The invention is further illustrated by the following examples wherein all parts and percentages are by weight unless otherwise indicated.

EXAMPLES

Example 1: Cold Forming of 10B21 Rivets

Figure 9:
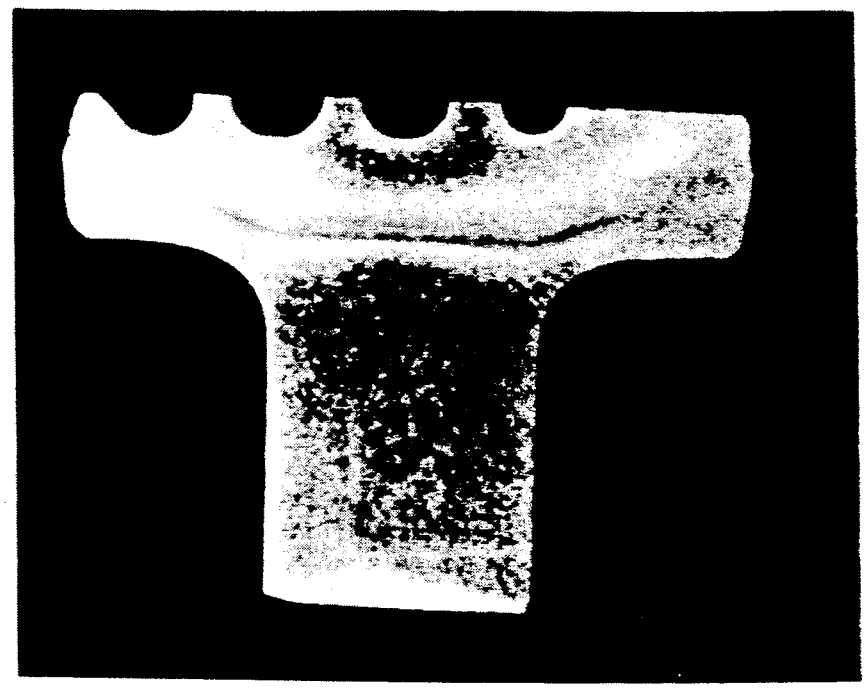
FIG. 9 shows a photomicrograph (8x) of a cross-sectioned, chemically etched AISI 10B21 rivet after the second stroke of the cold heading machine.

A two stroke cold heading press sold under the trade name "Hi-Pro Header", available from Waterbury Farrel, was used to form rivets having a dimpled exposed surface from AISI 10B21 steel at Twin City Rivet, Minneapolis, Minn. The steel was received from Rockford Wire Technologies Division of MGF industries, Inc., with offices in Rockford, Ill. as 0.476 cm diameter wire stock in the spheroidized, annealed, silicon killed condition. The steel was composed of 0.23% C; 0.288% Si; 0.002%B, the balance Fe, all percents as weight percent of total. The wire was slightly drawn before entering the press, where rivet precursors were cut to length (approx. 1.25 cm) using $3 \times 10^5$N force. Heads of rivets were partially formed during a first stroke of the press using $3 \times 10^5$N force to form rivet preforms (FIG. 8). After a position transfer, the heads of the rivet preforms were struck again with $3 \times 10^5$N force, forming dimpled rivets and completing the first cold forming process (FIG. 9). The rivets had head diameter of 1.18 cm, shank diameter of 0.48 cm, with 19 dimples each having diameter of 0.127 cm.

Example 2: Stress-Relieved 10B21 Rivets

Figure 10:
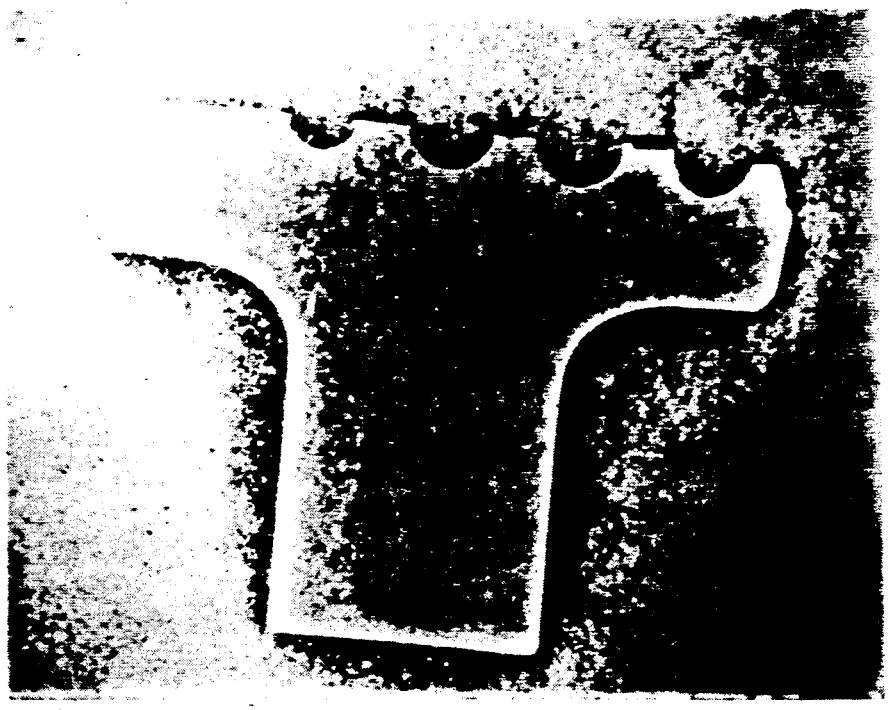
FIG. 10 shows a photomicrograph (8x) of a cross-sectioned, chemically etched AISI 10B21 rivet in the stress relieved condition.

Immediately after forming the rivets according to Example 1, the rivets were precleaned for 10 minutes with an alkaline solution made by mixing 1.14 liter of the alkaline liquid known under the trade designation "WSA 5000 Alkaline", 0.57 liter caustic soda, and 56.8 liters of water. Up to 115 kg of rivets were precleaned per load. The rivets were then rinsed with water for 5 minutes. The rivets were then placed in a furnace with an air atmosphere at 620°-650° C. for 1.5 hours to relieve residual stresses caused by the cold forming step of Example 1. (A stress concentration formed under the head of the rivet as a result of the cold forming of Example 1, as evidenced by the cross-sectioned, mounted, polished, and chemically etched rivet from Example 1, FIG. 9.) The rivets were then air cooled. The air atmosphere in the furnace caused an oxide scale to form on the surface of the rivets which required an acid wash (dilute sulfuric acid made by mixing 2.28 liters sulfuric acid, 1.14 liter of the plating solution known under the tradename "Truplate 9900", and 56.8 liters of water) immediately followed by caustic rinse and water rinses as described in the preclean step. The stress-relieved rivet of FIG. 10 still shows stress concentration near the head area.

Example 3: Brazing of Abrasive Particles to 10B21 Rivets

Figure 11:
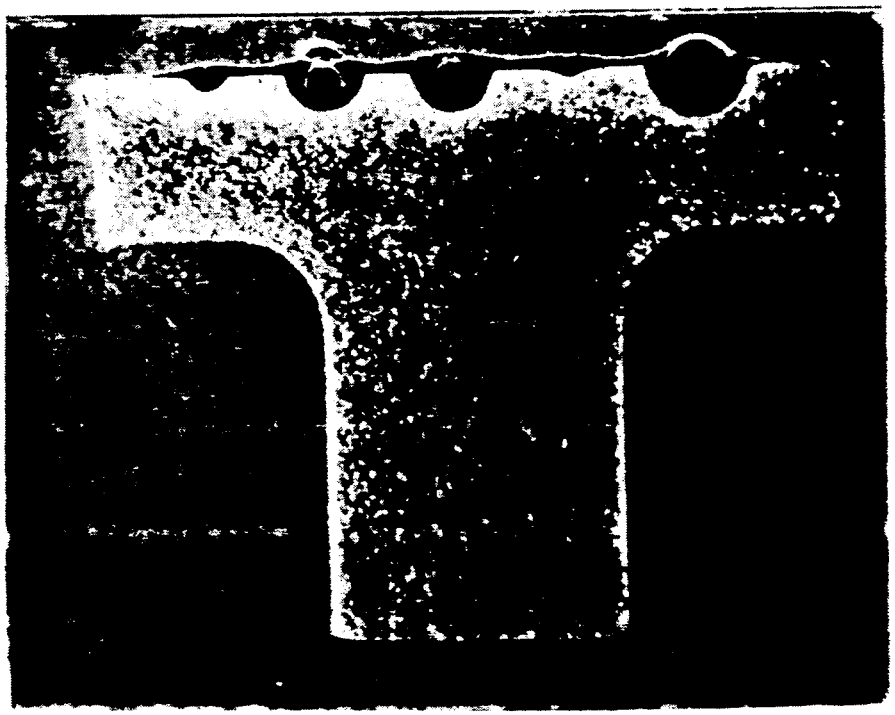
FIG. 11 shows a photomicrograph (8x) of a cross-sectioned, chemically etched AISI 10B21 rivet in the brazed condition.

The rivets of Example 2 were shipped to Lindberg Heat Treating, St. Louis Park, Minn., for brazing of tungsten carbide shot to the dimples on the exposed surface of the rivets. Individual rivets were loaded into ceramic fixtures (14 rivets per fixture) in preparation for brazing. Tungsten carbide shot was placed into the dimples and the exposed surface of the rivets covered with the nickel alloy brazing powder sold under the trade name "Amdry 770", available from Sulzer Plasma Technic, Inc., Troy, Mich. The ceramic fixtures and rivets were then loaded into a vacuum furnace at 315° C. and held at that temperature for 1 hour. The temperature of the furnace was raised via programmed temperature profile to 650° C., where the furnace temperature was held for 30 minutes. The furnace temperature was then raised to 760° C., 925° C. and 980° C., holding at each temperature for 30 minutes, and the furnace temperature finally raised to 1100° C. and held for 40 minutes. The furnace was then cooled to 980° C. and held for 1 minute and then quenched by a nitrogen gas backfill into the furnace. Following brazing, the rivets were removed from the ceramic fixtures and inspected. FIG. 11 shows the rivet in the brazed condition, where the diffusion of Ni into the steel base composition can be seen (white areas). The microhardness of one of the cross-sectioned rivets, measured at progressive intervals from the head of the rivet, near the central axis of the rivet, is shown in Table 1. This profile of hardness was very reproducible vs. hardness profiles obtained using AISI 1008 steel. Although not intending to be bound by any theory, it is thought the addition of C, and to a lesser extent B, increases the uniformity of the rivet-to-rivet hardness, greatly simplifying the brazing step and increasing production of usable rivets.

TABLE 1

| Microhardness for Rivets of Example 3 | |
|---|---|
| mm from head surface | Hardness |
| 0.061 | 28.3 HRC |
| 0.508 | 89.8 HRB |
| 1.27 | 79.3 HRB |
| 2.54 | 74.0 HRB |
| 5.08 | 76.3 HRB |
| 7.62 | 93.4 HRB |

Example 4: Austenitizing and Quenching of 10B21 Rivets

Figure 12:
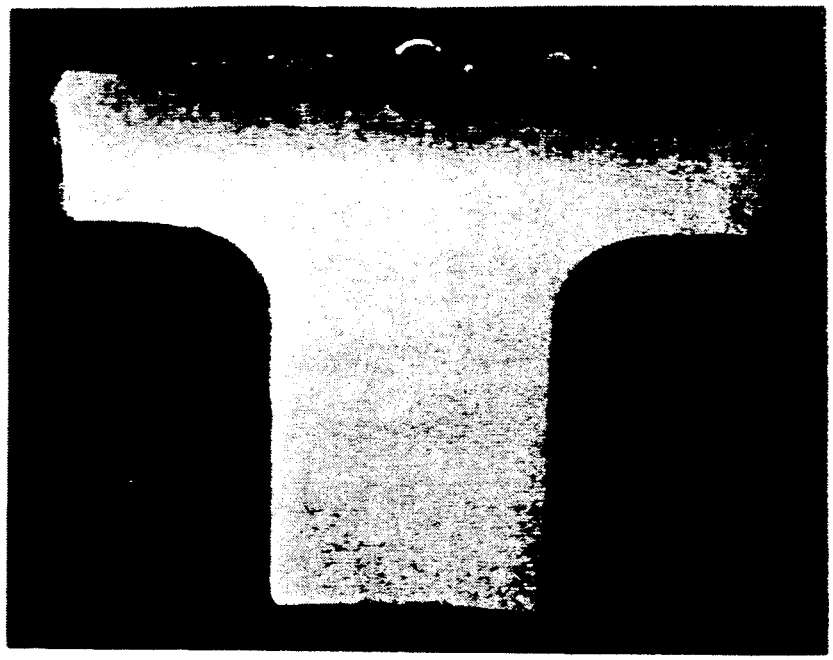
FIG. 12 shows a photomicrograph (8x) of a cross-sectioned, chemically etched AISI 10B21 rivet in the as quenched condition.

The rivets of Example 3 were placed into baskets (10,000-12,000 rivets per basket) and the rivet-filled baskets were placed into a furnace having an atmosphere of 0.2% carbon and heated to 835° C. After holding at this temperature for 30 minutes in the furnace the bucket and rivets were removed from the furnace and the entire bucket of rivets quenched in an agitated oil tank. A hot water wash of the bucket and rivets followed the quench to remove residual oil from the rivets' surface. One rivet was sectioned and mounted for analysis as shown in the photomicrograph (8x) of FIG. 12. The effect of the diffusion of the Ni from the brazing compound into the steel can be seen in the photomicrograph by the slightly darker region at the top of the rivet head. There was no longer evidence of stress concentration under the head of the rivet. Near the surface of the head there was a small amount of ferrite remaining in the grain boundaries in a primarily martensitic or bainitic structure. A microhardness profile was measured (each measurement at or near the central axis of the rivet) and the results presented in Table 2.

TABLE 2

| Microhardness for rivets of Example 4 | |
|---|---|
| mm from head surface | Hardness |
| 0.061 | 57.6 HRC |
| 0.508 | 56.0 HRC |
| 1.27 | 47.6 HRC |
| 2.54 | 47.4 HRC |
| 5.08 | 46.2 HRC |
| 7.62 | 45.5 HRC |

Example 5: Tempering of 10B21 Rivets at 705° C.

A portion of the austenitized and quenched rivets of Example 4 were tempered by placing the basket of rivets from Example 4 into a furnace having an air atmosphere and held at 705° C. for 1 hour, followed by a tumbling procedure to remove any oxide scale that had formed during the tempering process. A sample was sectioned and mounted for microhardness evaluation, with the data presented in Table 3. As can be seen by this data, the resulting structures were very soft near the central axis when tempered at 705° C.

TABLE 3

| Microhardness for rivets of Example 5 | |
|---|---|
| mm from head surface | Hardness |
| 0.061 | 25.6 HRC |
| 0.508 | 99.4 HRB |
| 1.27 | 92.2 HRB |
| 2.54 | 89.2 HRB |
| 5.08 | 89.0 HRB |
| 7.62 | 88.2 HRB |

Example 6: Tempering of 10B21 Rivets at 400° C.

The remaining rivets from Example 4 were tempered as in Example 5, only at a temperature of 400° C. rather than 705° C. Microhardness data near the central axis are shown in Table 4. Clearly, a more uniform hardness was achieved, as well as a harder structure than that from Example 5.

TABLE 4

| Microhardness for rivets of Example 6 | |
|---|---|
| mm from head surface | Hardness |
| 0.061 | 42.1 HRC |
| 0.508 | 40.9 HRC |
| 1.27 | 38.0 HRC |
| 2.54 | 36.1 HRC |
| 5.08 | 36.1 HRC |
| 7.62 | 35.9 HRC |

Example 7: Fastening of 10B21 Rivets to Strap

Some of the rivets tempered as in Example 5 were delivered to Plastic Products Company, Lindstrom, Minn., for fastening to an elongate strap as described above. A radial riveting machine sold under the trade name "Baltec", available from Bracker Corporation, of Pittsburgh, Pa., was used. Adjustment parameters included pressure, total time at pressure, and vertical travel speed of the tool. A pressure of 635 N/m$^2$, with a total time at this pressure of 3.5 seconds was used. The vertical travel speed was not calibrated but its dial position was set at 2.75 turns out. A sample rivet which was deformed at these conditions was sectioned and prepared for analysis. Microhardness data near the central axis of the rivet appear in Table 5.

TABLE 5

| Microhardness of rivets from Example 7 | |
|---|---|
| mm from head surface | Hardness |
| 0.061 | 90.8 HRB |
| 0.508 | 90.4 HRB |
| 1.27 | 82.0 HRB |
| 2.54 | 79.7 HRB |
| 5.08 | 22.2 HRC |
| 7.62 | 25.9 HRC |

Example 8: Wear Rate Comparison of 1006, 1010, and 10B21 Rivet Materials 100 roto peening flaps, each having 4 rivets as constructed as shown in FIGS. 3 and 4 with the addition of tungsten carbide shot brazed thereto, were fastened to a hub to form a roto peen wheel. The strap material used to construct the flaps was the linear polyurethane elastomer material as described in co-pending application Ser. No. 788,550, having even filing date, Example 1. All 100 flaps were installed on the same 10.2 cm diameter hub, sold under the trade name "RX-Hub", available from Minnesota Mining and Manufacturing Company, St. Paul, Minn. The wheel was tested to determine the relative and absolute wear rates of different rivets as follows: 31 of the 100 flaps were constructed with rivets made from AISI 1006 steel; 30 of the 100 flaps were made using case-hardened AISI 1010 steel; and 39 of the 100 flaps were constructed using AISI 10B21 steel, with flaps of each type grouped together on the wheel. Starting height, measured from the top of the peening particles to the bottom of the shank of the rivets, were measured, as well as the same height after peening. The results, after about 9856 square feet of concrete had been peened, are illustrated in Table 6. All heights are in centimeters.

TABLE 6

| Wear Rates of Various Rivet Materials | | | |
|---|---|---|---|
| | Rivet Material | | |
| | 1006 | 1010 | 1021, 0.001% B |
| Starting height | 0.772 | 0.779 | 0.772 |
| End Height | 0.733 | 0.760 | 0.754 |
| Difference | 0.03896 | 0.0191 | 0.01879 |
| Std. Dev. | 0.00475 | 0.00051 | 0.00381 |
| Variability | 0.64% | 0.67% | 0.52% |
| % Wear | 5.04% | 2.44% | 2.43% |

Figure 13:
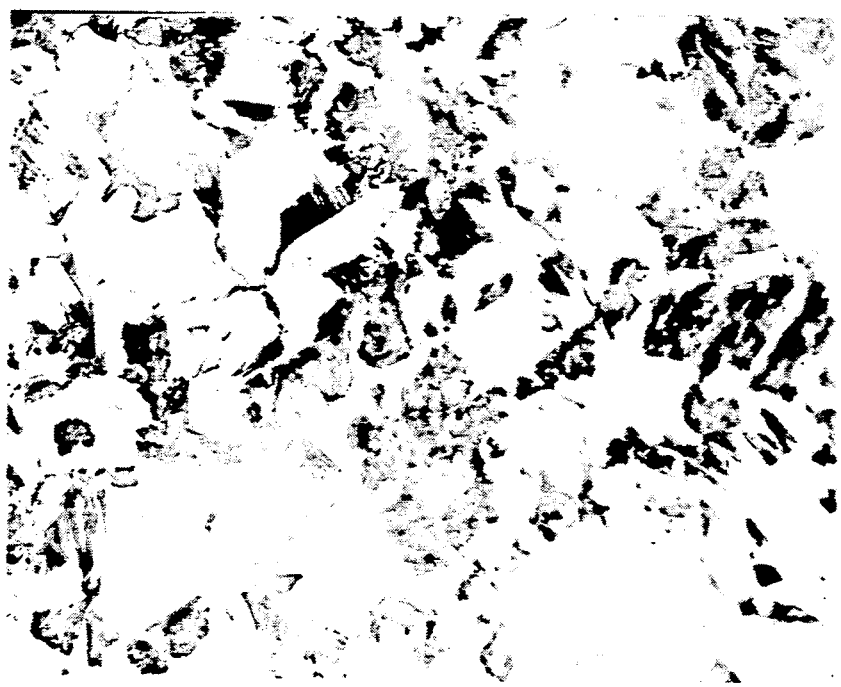
FIG. 13 shows a photomicrograph (400x) of a cross-sectioned, chemically etched AISI 1010 rivet in the quenched condition.

The data tabulated in Table 6 show that a lower percent wear, as defined by "difference"/"starting height" × 100, can be achieved with both 1010 and 10B21 steels. This is true even while using the cold heading press and radial riveting machine used to make the lower carbon content steel rivets. This ability to produce a hard, wear resistant surface while maintaining the base composition ductile enough to fasten the rivets into flaps is a surprising result. Although rivets made with 1010 steel having a case-hardened surface showed low % wear, and may qualify as a replacement material for 10B21, case hardened 1010 steel is not the most preferred rivet material for use in roto peen flaps for various reasons, such as the lack of uniformity in rivet-to-rivet hardness of the brazed rivets, as discussed in Example 3. Another reason 10B21 is more preferred than 1010 is that the two-phase, tempered microstructure of the 1010 material (ferrite, shown in white, with dark pearlite islands) is more susceptible to impact and fatigue failure than the tempered bainitic microstructure of 10B21, as shown in the photomicrograph (400x) of FIG. 13 (1010). Note also that the Table 6 data do not reflect what happens to the rivet profile; more specifically, the extent to which the tungsten carbide shot have been pushed toward the center of the rivet is not shown. However, a qualitative visual inspection of the 1010 and 10B21 rivets revealed that the 10B21 rivets held a "coarser", more abrasive profile.

Although the invention has been described in detail herein, the specific examples and embodiments described are not intended to limit the scope of the claims which follow. For example, when fastening rivets to the strap material, a shorter time than 3.5 seconds may produce a less work hardened rivet shank, holding vertical tool speed and pressure the same.

What is claimed is:

1. An improved high-intensity rotary peening particle support of the type having a plurality of peening particles metallurgically secured to an exposed surface thereof, wherein the improvement comprises the support having a base composition consisting essentially of from about 0.08 to about 0.34 weight percent C, the balance Fe, and a Ni-enriched layer extending below said exposed surface, said Ni-enriched layer having weight percent Ni greater than the base composition.

2. The support of claim 1 wherein said base composition further includes from about 0.0005 to about 0.003 weight percent B.

3. The support of claim 1 wherein the weight percent C ranges from about 0.18 to about 0.23.

4. The support of claim 1 wherein the weight percent C ranges from about 0.13 to about 0.18.

5. The support of claim 1 wherein the support is cold formed in the shape of a rivet, and said peening particles are metallurgically compatible with the base composition.

6. The support of claim 5 wherein said Ni-enriched layer has from about 0.02 to about 80 weight percent Ni.

7. The support of claim 6 wherein said Ni diffuses into said base composition to form a Ni-enriched layer having a thickness of about 0.5 mm.

8. The support of claim 1 wherein the peening particles comprise tungsten carbide shot having diameter ranging from about 0.25 mm to about 2.0 mm.

9. An improved method of making a rotary peening particle support which reduces peening particle support failure, the support having a plurality of peening particles metallurgically secured to an exposed face thereof, the method including the consecutive steps of cold forming a base metal stock preform to form the support, heating the cold formed support for a time and at a temperature sufficient to stress relieve the support, metallurgically joining a plurality of peening particles to the exposed face of the support, heating the support for a time and at a temperature sufficient to austenitize the support, quenching the support, and heating the support for a time and at a temperature sufficient to temper the support, wherein the improvement comprises the base metal stock consisting essentially of from about 0.08 to about 0.34 weight percent C, the balance Fe.

10. The method of claim 9 wherein said base metal stock further includes from about 0.0005 to about 0.003 weight percent B.

11. The method of claim 9 wherein the weight percent C ranges from about 0.18 to about 0.23.

12. The method of claim 9 wherein the support is cold formed in the shape of a rivet and the exposed face has a plurality of depressions, the cold forming process being a two stroke process having first and second strokes, the first stoke forming said preform from a rivet precursor, the second stroke forming the rivet from the preform, and wherein the peening particles are brazed to the depressions.

13. The method of claim 10, wherein said brazing utilizes a Ni brazing alloy having from about 80 to about 85 weight percent Ni.

14. The method of claim 13 wherein said support is held for time and at a temperature sufficient to allow the Ni to diffuse into the base metal to form a Ni-enriched layer having a thickness of about 0.5 mm, measured from the exposed surface downward.

15. A rotary peening particle support having a plurality of peening particles brazed to an exposed surface thereof, said support comprising a base composition and a Ni-enriched layer, said base composition consisting essentially of from 0.18 to 0.23 weight percent C, from 0.0005 to 0.003 weight percent B, the balance Fe, said Ni-enriched layer positioned substantially near the peening particles.

16. The peening particle support of claim 15 wherein said Ni-enriched layer has a hardness varying from about 20 to about 60 HRC, and a thickness ranging from about 0.01 mm to about 0.5 mm.

17. The peening particle support of claim 15 wherein said base composition has a hardness ranging from about 20 to about 60 HRC.

18. The peening particle support of claim 15 wherein said Ni-enriched layer has a hardness varying from about 20 to about 60 HRC and said base composition has a hardness ranging from about 80 HRB to about 30 HRC.

19. The peening particle support of claim 15 wherein said base composition and said Ni-enriched layer have hardness varying from about 35 to about 42 HRC.

20. A method of making a rotary peening particle support of the rivet-type having peening particles secured to an exposed surface thereof, said method comprising
  (a) cold forming a metal stock into a rivet, said rivet having a plurality of depressions in said exposed surface, said metal stock consisting essentially of from about 0.08 weight percent to about 0.34 weight percent C, the balance Fe;
  (b) stress relieving the rivet of step (a);
  (c) brazing said peening particles to said exposed surface;
  (d) austenitizing and quenching the rivet of step (c); and
  (e) tempering the rivet of step (d) at the desired tempering temperature and for a time sufficient to produce the desired hardness for said rivet.

21. Method in accordance with claim 20 wherein said metal stock further has from about 0.005 to about 0.003 weight percent B.

22. Method in accordance with claim 20 wherein said brazing utilizes a braze alloy having from about 80 to about 85 percent by weight Ni.

23. Method in accordance with claim 20 wherein said desired tempering temperature ranges from about 675° C. to about 730° C., and said desired hardness ranges from about 80 HRB to about 30 HRC.

24. Method in accordance with claim 20 wherein said desired temperature ranges from about 390° C. to about 410° C., and said desired hardness ranges from about 35 to about 42 HRC.

* * * * *

UNITED STATES PATENT AND TRADEMARK OFFICE
CERTIFICATE OF CORRECTION

PATENT NO.   : 5,179,852
DATED        : January 19, 1993
INVENTOR(S)  : Michael W. Lovejoy and Jennifer L. Trice It is certified that error appears in the above-identified patent and that said Letters Patent is hereby corrected as shown below:

Col. 1, line 31    "61-000-5490-4(1282)11," should read
                   --61-5000-5490-4(1282)11,--

Signed and Sealed this

Fourth Day of January, 1994

Attest:

BRUCE LEHMAN

*Attesting Officer*    *Commissioner of Patents and Trademarks*